(12) United States Patent
Guss

(10) Patent No.: US 6,386,854 B1
(45) Date of Patent: May 14, 2002

(54) PRESS FOR FORMING A COMPRESSIBLE FOOD ITEM

(76) Inventor: Tammy L Guss, 619 Galway La., Columbia, SC (US) 29209

( * ) Notice: Subject to any disclaimer, the term of this patent is extended or adjusted under 35 U.S.C. 154(b) by 0 days.

(21) Appl. No.: 09/549,957

(22) Filed: Apr. 14, 2000

Related U.S. Application Data

(60) Provisional application No. 60/192,185, filed on Mar. 27, 2000.

(51) Int. Cl.[7] .............................................. A21C 11/12
(52) U.S. Cl. ........................ 425/193; 425/195; 425/408; 426/503; 426/512
(58) Field of Search ................................ 425/183, 193, 425/186, 192 R, 195, 408, 410, 411, 298; 426/512, 503; 249/102

(56) References Cited

U.S. PATENT DOCUMENTS

| | | | | |
|---|---|---|---|---|
| 1,299,802 A | * | 4/1919 | Smith ........................... | 83/599 |
| 3,262,404 A | | 7/1966 | Morz et al. .................. | 425/183 |
| 4,083,666 A | * | 4/1978 | Richardson .................. | 425/183 |
| 4,180,889 A | | 1/1980 | Joffe .......................... | 249/66.1 |
| 4,442,604 A | | 4/1984 | Altman ......................... | 30/302 |
| 4,808,104 A | | 2/1989 | D'Orlando ................... | 425/298 |
| 4,950,147 A | * | 8/1990 | Willard et al. ............... | 425/185 |
| 4,973,240 A | * | 11/1990 | Reilly ........................... | 425/195 |
| 5,303,473 A | | 4/1994 | Sadler .......................... | 425/299 |
| 6,205,914 B1 | * | 3/2001 | McCarney .................... | 99/349 |

* cited by examiner

Primary Examiner—Robert Davis
Assistant Examiner—Thu Khanh T. Nguyen
(74) Attorney, Agent, or Firm—Michael A. Mann; Nexsen Pruet Jacobs & Pollard LLC

(57) ABSTRACT

A press that subdivides and shapes an amorphous food article into a plurality of discrete items having a particular shape, such as a hamburger patty, a decorative cookie, a biscuit, a ravioli, a turnover and the like. The press simultaneously forms a plurality of discrete items into a particular shape wherein each item has a uniform thickness. The press has a base and an opposing lid that are capable of moving toward each other in order to create a compressive force therebetween. A mold sheet and compression sheet are attached to the base and the lid, respectively, so that the mold sheet and the compression sheet are adjacent to each other. The mold sheet has a plurality of flanges protruding therefrom. The flanges act as a cutting edge for separating a compressible food article into a plurality of discrete items. Preferably, the flanges are formed in a shape to create an ornamental periphery in the discrete items. Compression sheet may optionally have extrusions protruding therefrom, in order to indent the discrete items. With the compression sheet having extrusions, the item is able to receive and hold a filling.

8 Claims, 5 Drawing Sheets

PRESS FOR FORMING A COMPRESSIBLE FOOD ITEM

1. PRIORITY CLAIM

This application claims the priority date of U.S. Provisional Application No. 60/192185, filed Mar. 27, 2000, which is hereby incorporated by reference.

2. FIELD OF THE INVENTION

The present invention relates generally to devices for compressing food articles, such as for example dough, hamburger meat and the like, into a particular shape; particularly, the present invention relates to a press for simultaneously molding a food article into a plurality of discrete items that have been formed into a particular shape.

3. BACKGROUND OF THE INVENTION

Many compressible food articles, such as dough, hamburger and the like, must be formed into a particular shape before being cooked, such as forming a hamburger patty, a decorative cookie, a biscuit, a ravioli, a turnover and the like. Unless the compressible food article is formed in a particular shape, it may take longer to cook and will not have the desired aesthetic effect. Unfortunately, forming the compressible food article in a particular shape is a tedious task. In addition, this task is messy due to the user being required to touch the compressible food item.

When a batch of items are to be formed into a particular shape and cooked simultaneously, uniformity of thickness is also important. If the thickness is not uniform, the items will not cook uniformly. In other words, some items in the batch will be burned while others will not be sufficiently cooked if the items in the batch do not have a uniform thickness. Typically, a compressible food article is rolled into a uniform thickness using a rolling pin. Unfortunately, rolling the compressible food article into a uniform thickness is a tedious and messy task to be avoided, if possible.

There have been a myriad of attempts to minimize the mess and tedium of forming a compressible food article into a discrete item with a particular shape. For example, U.S. Pat. No. 4,180,889 to Joffe teaches a mold for forming a compressible food article into a discrete item with a particular shape. Joffe, however, suffers the deficiency of being messy to use and only allows a single item to be formed at a time. Another attempt was made in U.S. Pat. No. 3,262,404 to Morz et al. In Morz, a cookie press is described which has a reservoir for holding a quantity of dough. A plunger is positioned above the dough and is capable of pushing dough out of the bottom of the press through an ornamentally shaped hole. Unfortunately, Morz et al. requires the user to cut the dough from the bottom of the press in order to create discrete items. As a result, it is very difficult for a user of the Morz et al. press to create discrete items which have a uniform thickness. Moreover, the press only allows a single item to be formed at a time.

Therefore there is a need for a device that simultaneously forms a plurality of discretely formed items of uniform thickness from a food article, without requiring the user to contact the compressible food article.

SUMMARY OF THE INVENTION

According to its major aspects and briefly described, the present invention is a press that subdivides and shapes an amorphous food article into a plurality of discrete items having a particular shape, such as a hamburger patty, a decorative cookie, a biscuit, a ravioli, a turnover and the like. The press simultaneously forms a plurality of discrete items into a particular shape wherein each item has a uniform thickness. The user simply pulls a lever on press without being required to ever touch the compressible food article. Moreover, the items may be formed in any desired shape.

The press comprises a base and an opposing lid that are capable of moving toward each other in order to create a compressive force therebetween. A mold sheet and compression sheet are attached to the base and the lid, respectively, so that the mold sheet and the compression sheet are adjacent to each other. The mold sheet has a plurality of flanges protruding therefrom. The flanges act as a cutting edge for separating a compressible food article into a plurality of discrete items. Preferably, the flanges are formed in a shape to create an ornamental periphery in the discrete items. Compression sheet may optionally have extrusions protruding therefrom, in order to indent the discrete items. With the compression sheet having extrusions, the item is able to receive and hold a filling. In order to use press, a compressible food article is placed between mold sheet and compression sheet. Next, lid and base are moved toward each other until flanges contact compression sheet to subdivide the compressible food article into a plurality of discrete items.

A major feature of the present invention is the ability of the press to simultaneously form a plurality of discretely shaped items from an amorphous food article. As a result, discretely shaped items can be produced much more quickly and efficiently.

Another important feature of the present invention is the uniform thickness of articles formed by the press. The uniform thickness of items formed by press is created by the uniform thickness of flanges in mold sheet. As a result, the plurality of discretely shaped items created by the press can be cooked simultaneously.

These and other features and their advantages will be apparent to those skilled in the art from a careful reading of the Detailed Description of Preferred Embodiments, accompanied by the following drawings.

DETAILED DESCRIPTION OF PREFERRED EMBODIMENTS

The present invention is a press for simultaneously forming numerous discrete, uniform items in a particular shape, such as a hamburger patty, a decorative cookie, a biscuit, a ravioli, a turnover and the like from a compressible food article. The term compressible food article refers to a type of food that can be deformed to a particular shape, such as dough, hamburger meat and the like.

Figure 1:
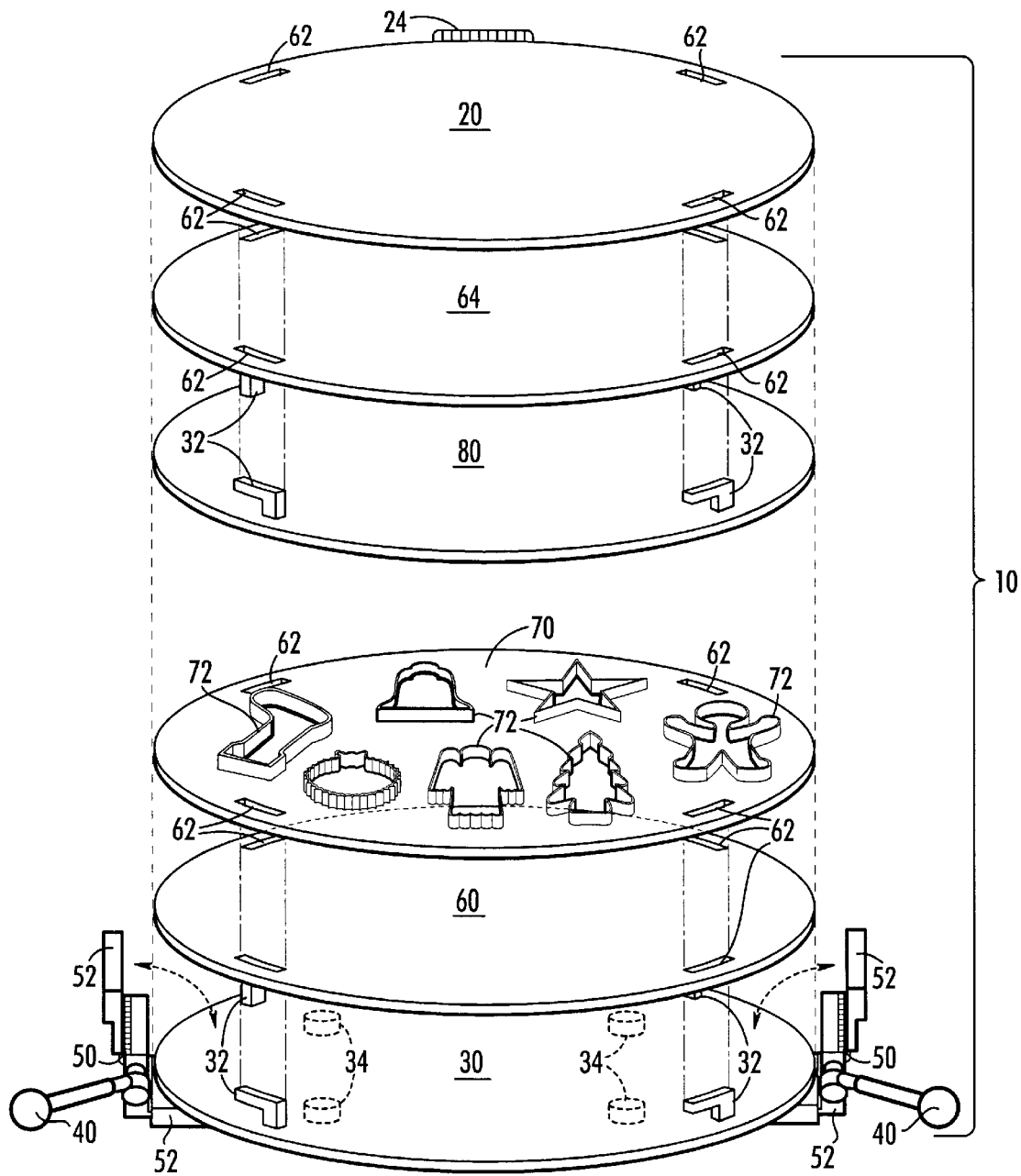
FIG. 1 is an exploded view of a press, according to a preferred embodiment of the present invention.

Referring to FIG. 1, the press, generally referred to by reference number 10, comprises a base 30 and an opposing lid 20 that are capable of moving toward each other in order to create a compressive force therebetween. Base 30 and lid 20 are connected together with a hinge 24. Base 30 may optionally have a plurality of legs 34 thereon to support base 30. A pair of clamps 50 with each having a pair of opposing jaws 52 is secured to base 30. In order to move lid 20 towards base 30 so that a sufficient compressive force is applied therebetween which will deform a compressible food item, opposing jaws 52 are positioned so that lid 20 and base 30 are secured therebetween. A lever 40 on clamp 50 moves opposing jaws 52 toward each other, thereby applying compressive force between lid 20 and base 30.

A first cover sheet 60 and second cover sheet 64 is secured to both lid 20 and base 30, respectively. Cover sheets 60 and 64 allow press to be cleaned more quickly. Cover sheets 60 and 64 may be quickly removed from lid 20 and base 30 in order to be placed in a dish washer or washed by hand.

A mold sheet 70 is attached to base 30 and is positioned between cover sheets 60 and 64. Both first cover sheet 60 and mold sheet 70 have a plurality of alignable notches 62 formed therein which have sufficient dimensions to receive locks 82 formed in base 30. In order to secure both first cover sheet 60 and mold sheet 70 in place, the sheets 60 and 70 are rotated so that locks 32 are engaged. It will be obvious to one of ordinary skill in the art that there are numerous other techniques for detachably securing first cover sheet 60 and mold sheet 70 to base 30.

Mold sheet 70 has a plurality of flanges 72 protruding therefrom. Flanges 72 form the peripheral shape of the discrete items subdivided from the compressible food article. When lid 20 and base 30 are moved together using clamp 50, flanges 72 act in conjunction with compression sheet 80 to subdivide compressible food article into discrete items. Flanges 72 have a uniform depth so that the discrete items formed therein have a uniform thickness.

A compression sheet 80 is attached to lid 20 between cover sheets 60 and 64 and adjacent to mold sheet 70. Both second cover sheet 64 and lid 20 have a plurality of alignable notches 62 formed therein which have sufficient dimensions to receive locks 32 formed in compression sheet 80. In order to secure both second cover sheet 64 and compression sheet 80 in place, the locks 32 are placed through notches 62 in second cover sheet 64 and lid 20 and are rotated so that locks 32 are engaged. It will be obvious to one of ordinary skill in the art that there are numerous other techniques for detachably securing second cover sheet 64 and compression sheet 80 to lid 20.

Compression sheet 80 acts in conjunction with mold sheet 70 to subdivide compressible food article into a plurality of discrete items. Compression sheet 80 may optionally have extrusions 84 protruding therefrom, in order to indent the discrete item within the periphery defined by flanges 72.

In order to form a compressible food article into a particular shape, it is placed between mold sheet 70 and compression sheet 80. Next, lid 20 and base 30 are moved toward each other until flanges 72 subdivide compressible food article into a plurality of discrete items. A discrete item will be formed within the each periphery defined by flanges 72. If mold sheet 70 has an opening within each periphery defined by flanges 72, removing mold sheet 70 will allow discrete items to pass through mold sheet 70 onto first cover sheet 60.

Figure 2A:
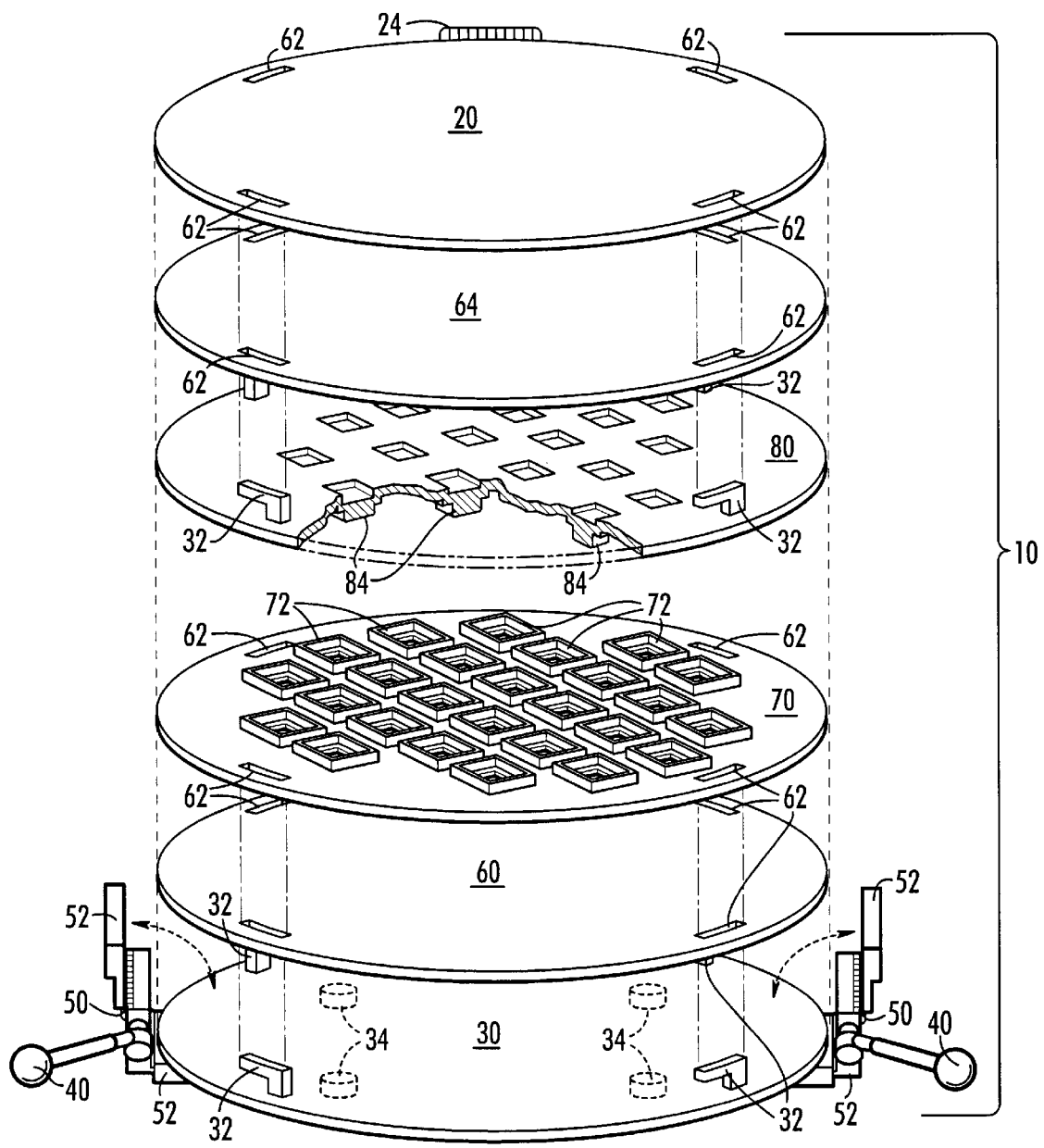
FIG. 2A is an exploded view of a press having a compression sheet with extrusions formed as would be used for the first step in creating an item with a filling, according to a preferred embodiment of the present invention.
Figure 2B:
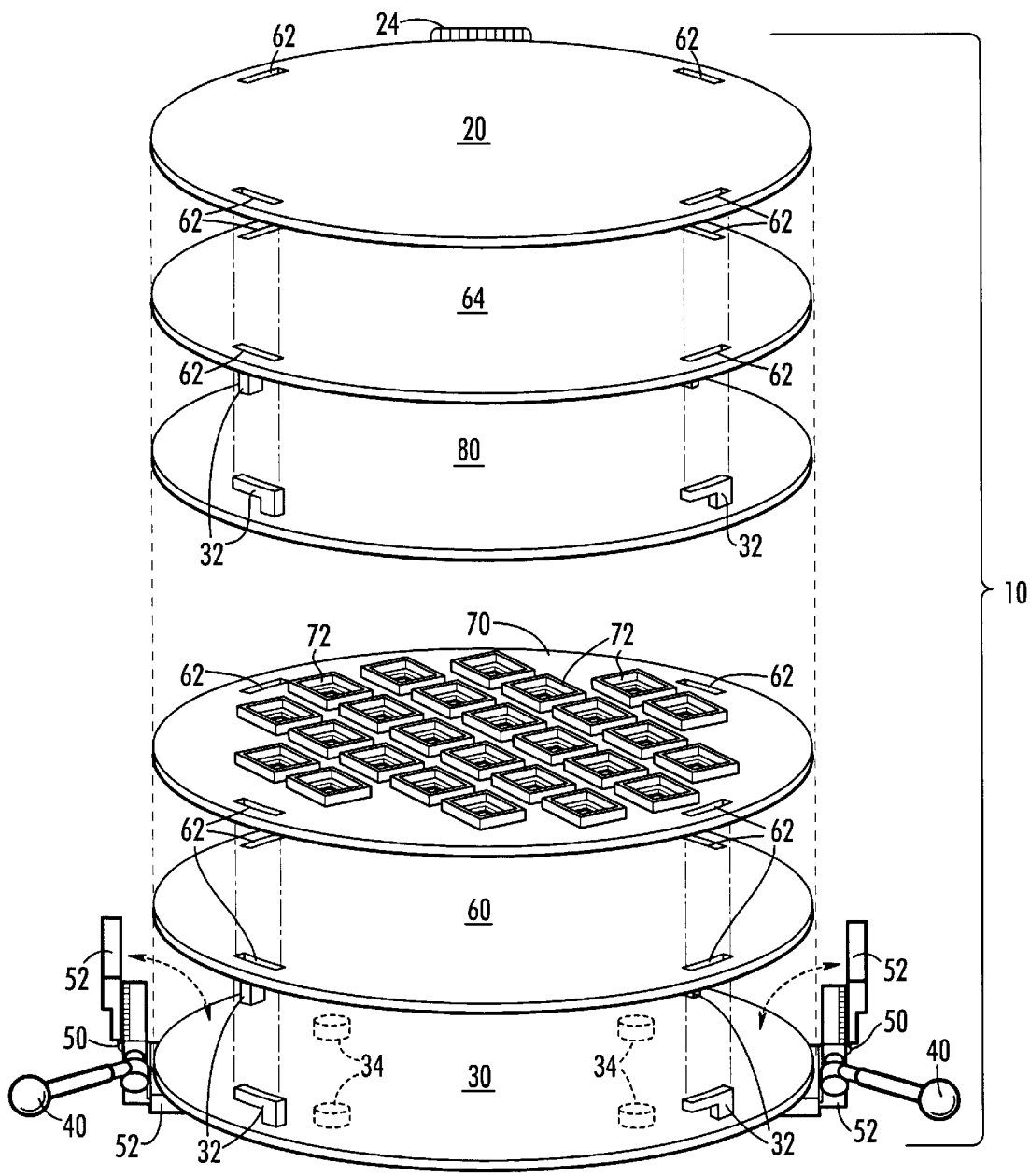
FIG. 2B is an exploded view of a press having a compression sheet without extrusions formed thereon as would be used for the second step in creating an item with a filling, according to a preferred embodiment of the present invention.
Figure 3A:
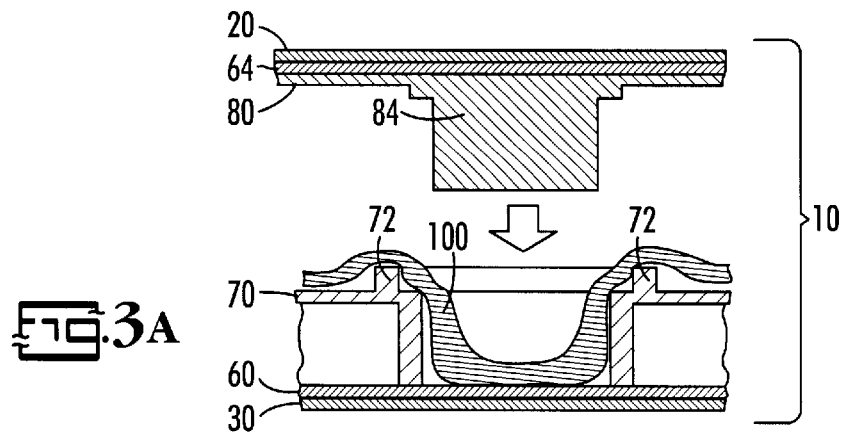
FIG. 3A is a detailed side cross-section view of a press having a compression sheet with extrusions formed as would be used for the first step in creating an item with a filling before to compressing compressible food item, according to a preferred embodiment of the present invention.
Figure 3B:
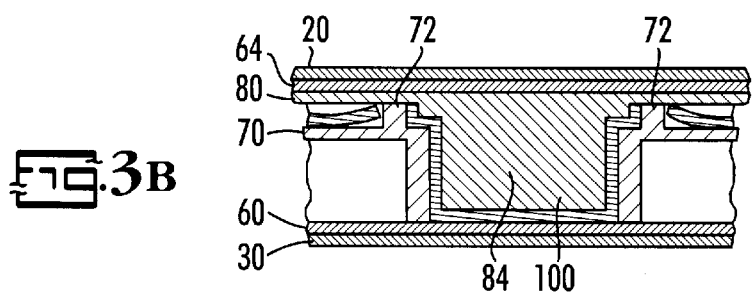
FIG. 3B is a detailed side cross-section view of a press having a compression sheet with extrusions formed as would be used for the first step in creating an item with a filling after compressing compressible food item, according to a preferred embodiment of the present invention.
Figure 3C:
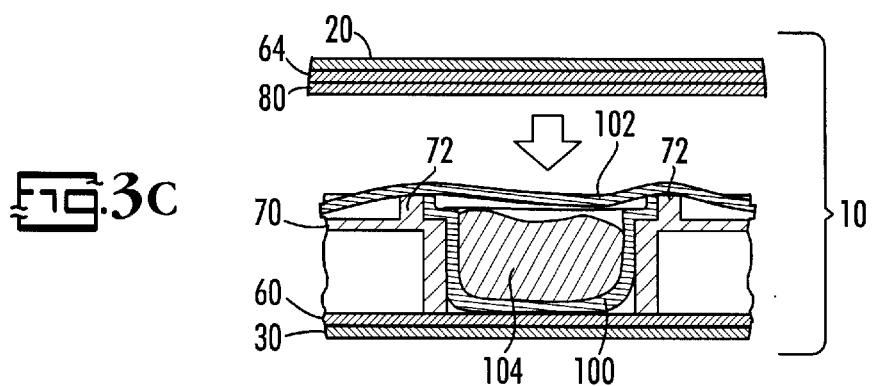
FIG. 3C is a detailed side cross-section view of a press having a compression sheet without extrusions formed thereon as would be used for the second step in creating an item with a filling before to compressing compressible food item, according to a preferred embodiment of the present invention.
Figure 3D:
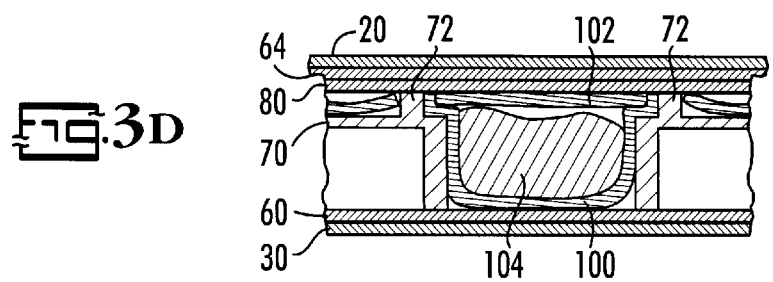
FIG. 3D is a detailed side cross-section view of a press having a compression sheet without extrusions formed thereon as would be used for the second step in creating an item with a filling after compressing compressible food item, according to a preferred embodiment of the present invention.
Figure 4:
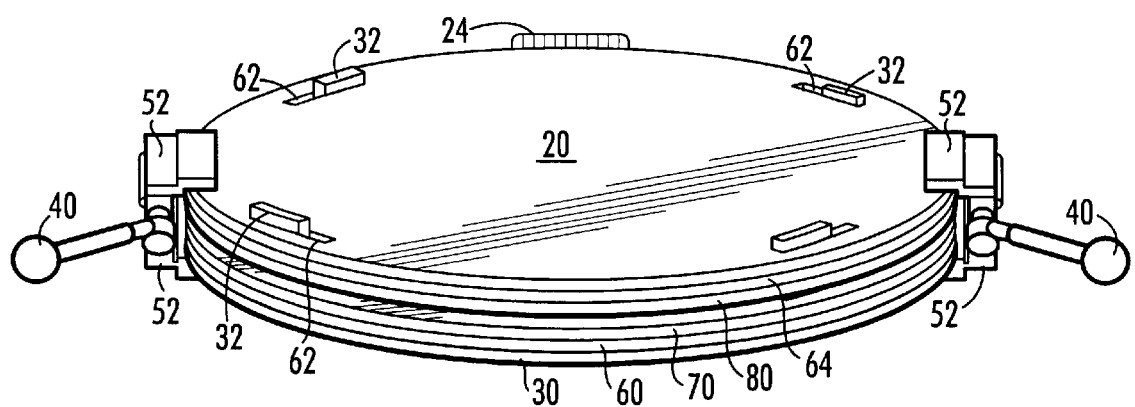
FIG. 4 is a perspective view of a press, according to a preferred embodiment of the present invention.

Referring to FIGS. 2A and 2B, the configuration for creating a shape capable of receiving and holding a filling 104, such as for a ravioli, turnover and the like, in a two-step process is shown. FIG. 2A shows the configuration for the first step and FIG. 2B shows the configuration for the second step. Referring to FIGS. 3A 3D, a detailed side cross-sectional view of the two-step process for creating a shape capable of receiving and holding a filling. FIGS. 3A and 3B correspond to FIG. 2A while FIGS. 3C and 3D correspond to FIG. 2B.

In order to form compressible food article into a shape capable of receiving and holding a filling 104, a first layer of compressible food article 100 is placed between mold sheet 70 and compression sheet 80, as shown in FIG. 3A. Compression sheet 80 has an extrusion 84 protruding therefrom to form an indentation in the first layer of compressible food article 100. When lever 40 on clamp 50 is pulled, each extrusion 84 is received within each periphery of flanges 72 to subdivide and form an indentation in the first layer of compressible food article 100, as illustrated in FIG. 3B. At this point, a filling 104 may be placed into indentation. Next, a second layer of compressible food article 102 is placed between mold sheet 70 and compression sheet 80, as illustrated in FIG. 3C. Lever 40 on clamp 50 is again pulled, thereby subdividing second layer of compressible food article 102 and sealing filling 104 between first layer 100 and second layer 102 of compressible food article.

It will be apparent to those skilled in the art that many substitutions and modifications may be made to the preferred embodiments just described without departing from the spirit and scope of the present invention, defined by the appended claim.

What is claimed is:

1. A device for forming a compressible item into a desired shape, said device comprising:

a base;

an opposing lid;

a mold sheet positionable between said base and said lid;

a compression sheet positionable between said base and said lid;

a first cover sheet positionable adjacent said mold sheet;

means for moving said mold sheet into engagement with said compression sheet; and means carried by said mold sheet for forming a compressible item into a desired shape on said first cover sheet when said compression sheet engages said mold sheet and said compressible item has been placed therebetween to press said compressible item through said mold sheet onto said first cover sheet.

2. The device as recited in claim 1, further comprising a hinge connecting said lid and said base.

3. The device as recited in claim 1, further comprising means for aligning said compression sheet and said base.

4. The device as recited in claim 1, further comprising means for aligning said mold sheet and said lid.

5. The device as recited in claim 1, further comprising a second cover sheet positionable adjacent said compression sheet.

6. A device for forming a compressible item into a desired shape, said device comprising:

a base;

an opposing lid;

a mold sheet positionable between said base and said lid, said mold sheet carrying flanges defining a desired shape for a compressible item;

a compression sheet positionable between said base and said lid;

a cover sheet positioned adjacent to said mold sheet;

means for moving said flanges of said mold sheet into engagement with said compression sheet so that said compressible item, when positioned between said compression sheet and said mold sheet, is pressed by said compression sheet against said flanges and said mold sheet into said desired shape on said cover sheet.

7. The device as recited in claim 6, further comprising means for aligning said mold sheet and said lid.

8. The device as recited in claim 6, further comprising means for aligning said compression sheet and said base.

* * * * *